(12) United States Patent
Sadalgi et al.

(10) Patent No.: US 11,875,464 B2
(45) Date of Patent: *Jan. 16, 2024

(54) SYSTEMS AND METHODS FOR SCENE-INDEPENDENT AUGMENTED REALITY INTERFACES

(71) Applicant: Wayfair LLC, Boston, MA (US)

(72) Inventors: Shrenik Sadalgi, Cambridge, MA (US); Kunal Rajesh Khona, Malden, MA (US)

(73) Assignee: Wayfair LLC, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/363,998

(22) Filed: Jun. 30, 2021

(65) Prior Publication Data

US 2021/0327154 A1    Oct. 21, 2021

Related U.S. Application Data

(63) Continuation of application No. 16/691,952, filed on Nov. 22, 2019, now Pat. No. 11,080,935.

(60) Provisional application No. 62/828,749, filed on Apr. 3, 2019.

(51) Int. Cl.
| | | |
|---|---|---|
| G06T 19/00 | (2011.01) | |
| G06F 3/01 | (2006.01) | |
| G06F 3/04815 | (2022.01) | |
| G02B 27/01 | (2006.01) | |
| G06V 20/20 | (2022.01) | |

(52) U.S. Cl.
CPC .......... *G06T 19/006* (2013.01); *G02B 27/017* (2013.01); *G06F 3/011* (2013.01); *G06F 3/017* (2013.01); *G06F 3/04815* (2013.01); *G06V 20/20* (2022.01); *G02B 2027/014* (2013.01); *G02B 2027/0138* (2013.01)

(58) Field of Classification Search
None
See application file for complete search history.

(56) References Cited

U.S. PATENT DOCUMENTS

| | | | |
|---|---|---|---|
| 11,080,935 B2 * | 8/2021 | Sadalgi | .................. G06F 3/011 |
| 2013/0293468 A1 | 11/2013 | Perez et al. | |
| 2017/0161404 A1 | 6/2017 | High et al. | |
| 2018/0075649 A1 | 3/2018 | Godwin et al. | |

(Continued)

*Primary Examiner* — Nurun Flora
(74) *Attorney, Agent, or Firm* — Wolf, Greenfield & Sacks, P.C.

(57) ABSTRACT

Some embodiments include a method comprising using a first computing device to perform: obtaining an image of a scene captured using a camera coupled to the first computing device; obtaining camera setting values used to capture the image; determining, using the image, surface attribute values characterizing at least one surface shown in the image of the scene; generating an augmented reality (AR) interface at least in part by using the camera setting values and the surface attribute values to create a first composite image by overlaying a selected virtual furniture object onto the image so that the virtual furniture object is displayed in the AR interface as being on a first surface of the at least one surface shown in the image; and transmitting, to a second computing device and via at least one communication network, the first composite image, the camera setting values and the surface attribute values.

22 Claims, 11 Drawing Sheets

(56) References Cited

U.S. PATENT DOCUMENTS

| | | | |
|---|---|---|---|
| 2019/0051054 A1* | 2/2019 | Jovanovic | G06T 17/00 |
| 2019/0197599 A1 | 6/2019 | Zia et al. | |
| 2020/0051334 A1* | 2/2020 | Leung | G06T 7/73 |
| 2020/0074738 A1* | 3/2020 | Hare | G06F 3/04845 |
| 2020/0320792 A1 | 10/2020 | Sadalgi et al. | |

* cited by examiner

SYSTEMS AND METHODS FOR SCENE-INDEPENDENT AUGMENTED REALITY INTERFACES

This application claims the benefit under 35 U.S.C. § 120 as a continuation of U.S. application Ser. No. 16/691,952, filed Nov. 22, 2019, entitled "SYSTEMS AND METHODS FOR SCENE-INDEPENDENT AUGMENTED REALITY INTERFACES", which claims the benefit under 35 U.S.C. 119(e) of U.S. Provisional Application Ser. No. 62/828,749, filed Apr. 3, 2019, entitled "SYSTEMS AND METHODS FOR SCENE-INDEPENDENT AUGMENTED REALITY INTERFACES". The contents of these applications are incorporated herein by reference in their entirety.

BACKGROUND

Augmented reality (AR) systems provide users with an interactive experience of a real-world environment by overlaying computer-generated perceptual information on aspects of the real-world environment. AR interfaces can be displayed on various devices such as, smartphones, head-mounted displays, smart glasses, and mobile devices. Retailers have recently started using AR interfaces to enhance customers' shopping experience.

SUMMARY

Conventional augmented reality (AR) interfaces are scene dependent because a user must be physically at the scene in order to view an AR interface that superimposes one or more virtual objects on the scene. By contrast, the techniques developed by the inventors and described herein allow for a user to view an AR interface that overlays virtual objects onto a real-world scene even when the user is physically not at the scene (e.g., remote from the scene). For this reason, the AR interfaces described in this application may be referred to as "scene-independent" AR interfaces.

Some embodiments provide for a method comprising using a first computing device to perform: obtaining an image of a scene captured using a camera coupled to the first computing device; obtaining camera setting values used to capture the image; determining, using the image, surface attribute values characterizing at least one surface shown in the image of the scene; generating an augmented reality (AR) interface at least in part by using the camera setting values and the surface attribute values to create a first composite image by overlaying a selected virtual object onto the image so that the virtual object is displayed in the AR interface as being on a first surface of the at least one surface shown in the image of the scene; and transmitting, to a second computing device and via at least one communication network, the first composite image, the camera setting values and the surface attribute values.

Some embodiments provide for at least one non-transitory computer-readable storage medium storing processor-executable instructions that, when executed by at least one processor of a first computing device, cause the at least one processor to perform: obtaining an image of a scene captured using a camera coupled to the first computing device; obtaining camera setting values used to capture the image; determining, using the image, surface attribute values characterizing at least one surface shown in the image of the scene; generating an augmented reality (AR) interface at least in part by using the camera setting values and the surface attribute values to create a first composite image by overlaying a selected virtual object onto the image so that the virtual object is displayed in the AR interface as being on a first surface of the at least one surface shown in the image of the scene; and transmitting, to a second computing device and via at least one communication network, the first composite image, the camera setting values and the surface attribute values.

Some embodiments provide for a system comprising at least one computer hardware processor; and at least one non-transitory computer-readable storage medium storing processor-executable instructions that, when executed by the at least one computer hardware processor of a first computing device, cause the at least one computer hardware processor to perform: obtaining an image of a scene captured using a camera coupled to the first computing device; obtaining camera setting values used to capture the image; determining, using the image, surface attribute values characterizing at least one surface shown in the image of the scene; generating an augmented reality (AR) interface at least in part by using the camera setting values and the surface attribute values to create a first composite image by overlaying a selected virtual object onto the image so that the virtual object is displayed in the AR interface as being on a first surface of the at least one surface shown in the image of the scene; and transmitting, to a second computing device and via at least one communication network, the first composite image, the camera setting values and the surface attribute values.

Some embodiments provide for a method comprising using a second computing device to perform: receiving, from a first computing device and via at least one communication network: (1) a first composite image of a scene obtained by overlaying a first virtual object on an image of a scene; (2) camera setting values used to capture the image of the scene; and (3) surface attribute values characterizing at least one surface in the image of the scene; generating a graphical user interface (GUI) using the first composite image, the camera setting values, and the surface attribute values; receiving, via the GUI, user input indicating a second virtual object to add to the first composite image, indicating a change to the first virtual object in the first composite image, and/or indicating to remove the first virtual object from the first composite image; and generating a second composite image based on the received user input.

Some embodiments provide for at least one non-transitory computer-readable storage medium storing processor-executable instructions that, when executed by at least one processor of a second computing device, cause the at least one processor to perform:

receiving, from a first computing device and via at least one communication network: (1) a first composite image of a scene obtained by overlaying a first virtual object on an image of a scene; (2) camera setting values used to capture the image of the scene; and (3) surface attribute values characterizing at least one surface in the image of the scene; generating a graphical user interface (GUI) using the first composite image, the camera setting values, and the surface attribute values; receiving, via the GUI, user input indicating a second virtual object to add to the first composite image, indicating a change to the first virtual object in the first composite image, and/or indicating to remove the first virtual object from the first composite image; and generating a second composite image based on the received user input.

Some embodiments provide for a system comprising: at least one computer hardware processor; and at least one non-transitory computer-readable storage medium storing processor-executable instructions that, when executed by the at least one computer hardware processor of a second computing device, cause the at least one computer hardware processor to perform: receiving, from a first computing device and via at least one communication network: (1) a first composite image of a scene obtained by overlaying a first virtual object on an image of a scene; (2) camera setting values used to capture the image of the scene; and (3) surface attribute values characterizing at least one surface in the image of the scene; generating a graphical user interface (GUI) using the first composite image, the camera setting values, and the surface attribute values; receiving, via the GUI, user input indicating a second virtual object to add to the first composite image, indicating a change to the first virtual object in the first composite image, and/or indicating to remove the first virtual object from the first composite image; and generating a second composite image based on the received user input.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF THE DRAWINGS

Various aspects and embodiments will be described with reference to the following figures. It should be appreciated that the figures are not necessarily drawn to scale. Items appearing in multiple figures are indicated by the same or a similar reference number in all the figures in which they appear.

DETAILED DESCRIPTION

Figure 1:
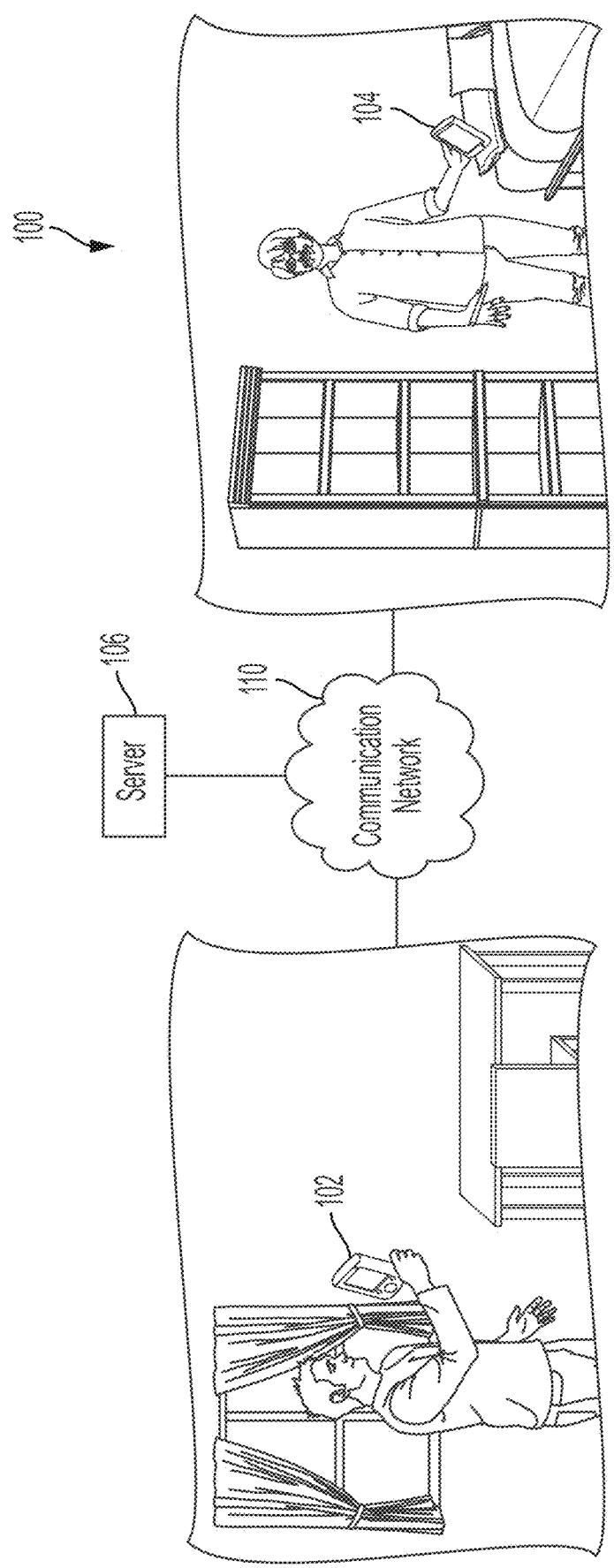
FIG. 1 is an example system configured capture an image of a scene at a first computing device 102 and recreate the scene at a second computing device 104, according to some embodiments of the technology described herein.

As mentioned above, some retailers have started using augmented reality (AR) systems to enhance customers' shopping experience, for instance, when customers try to buy furniture from an online retailer's website rather than a brick-and-mortar setting. The inventors have appreciated that while conventional AR interfaces allow users to visualize a piece of furniture (e.g., from the retailer's online catalog) in a real-world scene e.g., a room where the user is located such conventional AR interfaces are scene dependent because the user is unable to recreate these interfaces at different locations (e.g., in a different room or environment), For example, the user may start designing a room in his home by using his smartphone to engage in an AR experience in which he adds a piece of furniture to a particular surface in his living room (e.g., by placing a table on the living room floor). The user may then want to continue with the process (e.g., add other pieces of furniture or alter the position of the existing piece of furniture) at his office or a different location, perhaps by using a different device, such as his office desktop computer rather than his smartphone. Conventional scene-dependent AR interfaces systems do not, provide the user with such flexibility and are limited to operating at one location and using one hardware platform.

To address the above-described shortcomings of conventional AR interfaces, the inventors have developed techniques for creating scene-independent AR interfaces that allow a user to interact with an AR interface to a particular real-world scene (e.g., the user's office) regardless of whether the user is physically located at or near the real-world scene. The techniques described allow the user to capture an AR interface in the form of an image of a real-world scene in which the user is located and metadata associated with the AR interface, which together can be communicated to and used to recreate the AR interface for the user when he is no longer at the scene and/or for another user not at the scene.

For instance, continuing with the example above, a user may generate an AR interface to his room using his smartphone. A user may select a piece of furniture from a retailer's online catalog and the piece of furniture may be displayed as a virtual object (e.g., a virtual three-dimensional (3D) furniture object) in the AR interface. The user may manipulate the virtual object via the AR interface and position it, within the AR interface, on a surface in the room. The user may then direct the AR interface to capture a "snapshot" or a "smart photo" of the AR interface in response to user input indicating that a snapshot of the AR interface is to be captured, an image of the scene and associated metadata indicating how to recreate the AR interface using the image is captured. The associated metadata may include, by way of example and not limitation, information about virtual object(s) in the AR interface (e.g., identifiers, position, and/or orientation of the virtual object(s) in the AR interface), information about the settings of the camera when capturing images of the real-world scene in the AR interface, information about one or more surfaces in the image, etc. Together, the image and metadata constitute a "smart photo"—information that may be used to reproduce the AR interface at a different location and/or using a different device, making the AR interface scene-independent. For example, the image and metadata may be stored on a server, and may be retrieved from the server by another device (e.g., the user's office desktop computer) to reproduce the AR interface at a different location.

The inventors have appreciated that providing a combination of the image and metadata allows an AR interface first presented to one user to be recreated by a different user (e.g., a designer assisting the user with interior design) using her computing device. In this scenario, the image may be displayed at the designer's computing device and the metadata may be used to manipulate camera settings, the image, and/or virtual object attributes to recreate the AR interface at the designer's computing device. The designer may then interact with the AR interface, for example, by manipulating the virtual objects in the AR interface, adding new virtual objects to the AR interface, removing existing virtual objects from the interface, etc. For example, the designer may re-position one or more pieces of furniture selected by the user to a different location in the room, remove one of the pieces of furniture selected by the user and replace it with a different piece of furniture that she selects.

Accordingly, the disclosure provides techniques for capturing a user's AR interface such that information associated with the AR interface may be used to recreate the AR interface at a later time, for example, at a different location and/or using a different device. In some embodiments, these techniques may be embodied, at least in part, in a software application (hereinafter "App") that may be installed on a first computing device. The first computing device may be a user's smartphone, a tablet computer, an AR headset, or any other mobile computing device configured to generate AR interfaces.

In some embodiments, the first computing device may: (1) obtain an image of a scene (e.g., a room in a building such as a bedroom, living room, office, kitchen, etc.) captured using a camera coupled to the first computing device; (2) obtain camera setting values used to capture the image; (3) determine, using the image, surface attribute values characterizing at least one surface (e.g., floor, walls, table top(s), or any other surface on which furniture, art, or other decor may be placed) shown in the image of the scene; (4) generate an AR interface at least in part by using the camera setting values and the surface attribute values to create a first composite image by overlaying a selected virtual object onto the image so that the virtual object is displayed in the AR interface as being on a first surface of the at least one surface shown in the image of the scene; and (5) transmit, to a second computing device and via at least one communication network, the first composite image, the camera setting values and the surface attribute values. The second computing device may be a server or a mobile device of a second user. In turn, the second user may access the first composite image, the camera setting values and the surface attribute values from the server and/or mobile device and use the accessed information to recreate the AR interface.

In some embodiments, the generated AR interface may be presented to the user of the first computing device who may interact with the AR interface generated by the first computing device to manipulate, remove, or add virtual objects. For example, the user may interact with the AR interface by manipulating, removing, or adding virtual furniture objects, virtual art objects, and/or other virtual decor objects (e.g., photographs, curtains, plants, etc.).

In some embodiments, the camera may be integrated with the computing device. In other embodiments, the camera may be removably attached to the computing device.

In some embodiments, the first computing device may obtain camera setting values used to capture the image because these settings may be used for recreating the AR interface. Non-limiting examples of the camera setting values include: values associated with a field of view of the camera, values indicating a projection from three-dimensional (3D) points in the scene to two-dimensional (2D) points in the image, and/or values indicating a position and/or orientation of the camera.

In some embodiments, the surface attribute values comprise one or more values associated with a pose of a plane characterizing the at least one surface, and/or values indicating 3D points representing the plane. The surface attribute values may be determined by processing one or more images of a scene using various computer vision techniques.

In some embodiments, the first computing device may generate an AR interface at least in part by using the camera setting values and the surface attribute values to create a first composite image by overlaying a selected virtual object (e.g., a virtual furniture object selected from the retailer's online catalog) onto the image so that the virtual object is displayed in the AR interface as being on a first surface of the at least one surface shown in the image. The generated AR interface may be presented to the user of the first computing device via a display of the first computing device. Example virtual furniture objects include: couches, chairs, desks, tables, shelves, bookcases, beds, nightstands, cabinets, rugs, dressers, wardrobes, entertainment centers, and decorative items, such as statutes, wall art, picture frames, books, and vases. Each of the virtual furniture objects may define the characteristics of the piece of furniture such as the shape and/or size of the furniture. Additionally, each virtual furniture object may be accompanied by object attribute values (e.g., values specifying an identifier of the virtual furniture object, a position and/or orientation of the virtual furniture object in the image, or a visual characteristic of the virtual furniture object).

In some embodiments, creating the first composite image comprises: identifying a location of the first surface in the image using the surface attribute values; and determining a position in the image at which to place the virtual furniture object using the location of the first surface. In some embodiments, a user may place the virtual furniture object (e.g., chair) on a particular surface (e.g., floor) in the AR interface. In this example, the first composite image may be created by identifying the location of the floor surface in the image and determining a position in the image at which to place the chair based on the identified location of the floor surface.

According to some embodiments, the AR interface includes a first portion for displaying the first composite image and a second portion containing one or more graphical user interface (GUI) elements (e.g., buttons, toggles, etc.) through which the user may provide input to the AR interface. For example, user input selecting the virtual furniture object may be received through the AR interface by selecting a GUI element associated with the virtual furniture object. As another example, the user may select a "capture" or "save" button that causes an image of the scene to be captured via the camera of the first computing device.

In some embodiments, the first computing device may transmit the first composite image, the camera setting values and the surface attribute values to a second computing device (e.g., a server or another mobile computing device) via at least one communication network. In some embodiments, the first computing device may also transmit the object attribute values associated with the virtual furniture object to the second computing device.

In some embodiments, this transmitted information may be retrieved from the second computing device by the user at a later time using the same (i.e., first computing device) or different computing device. The information may also be retrieved by a different user (e.g., a designer) using his own computing device (e.g., desktop computer, tablet computer, or smartphone). The scene captured at the first computing device is recreated at the designer's computing device using the first composite image, the camera setting values and the surface attribute values. The designer may interact with recreated scene by manipulating the virtual furniture objects, e.g., changing the position and/or orientation of the objects. The designer may also add other virtual furniture objects to the scene or remove existing objects from the scene. An updated image (e.g., a second composite image) may be created at the designer's computing device and transmitted to the server computing device.

In some embodiments, the second composite image may be obtained by changing the first composite image. Changing the first composite image may include adding a virtual furniture object to the first composite image, removing a virtual furniture object from the first composite image, changing a position and/or orientation of a virtual furniture object in the first composite image, and/or changing a visual characteristic of a virtual furniture object in the first composite image.

Some embodiments provide for a method that uses a second computing device (e.g., a designer's computing device) to perform: receiving, from a first computing device and via at least one communication network: (1) a first composite image of a scene obtained by overlaying a first virtual object on an image of a scene; (2) camera setting values used to capture the image of the scene; and (3) surface attribute values characterizing at least one surface in the image of the scene. The first composite image may be generated at the first computing device (e.g., the user's computing device). The first computing device may be configured to operate using a different platform than the designer's computing device. For example, the designer's computing device may include a smartphone operating using an iOS operating system and the user's computing device may include a smartphone operating using an Android operating system. As another example, the designer's computing device may include a desktop computer and the user's computing device may include a smartphone.

The method further uses the second computing device to perform: generating GUI (e.g., an AR interface, a virtual reality interface, a 3D rendering interface) using the first composite image, the camera setting values, and the surface attribute values; receiving, via the GUI, user input indicating a second virtual object to add to the first composite image, indicating a change to the first virtual object in the first composite image, and/or indicating to remove the first virtual object from the first composite image; and generating a second composite image based on the received user input.

In some embodiments, the second composite image that includes change(s) to the virtual furniture object (e.g., changes made by the designer). The second composite image may be transmitted by the designer's computing device to the server computing device along with the camera setting values, and the surface attribute values. In some implementations, the camera setting values and the surface attribute values need not be transmitted as the server computing device already maintains this information in association with the first composite image.

In some embodiments, when the user desires to view the changes made by the designer, the user's computing device may generate a GUI interface (e.g., an AR interface, a virtual reality interface, a 3D rendering interface) using the second composite image, the camera setting values and the surface attribute values. The user's computing device may receive the second composite image, the camera setting values and the surface attribute values, from the server computing device. The App may initiate a 3D rendering session at the user's computing device based on user input. The App may, as part of the 3D rendering session, recreate the scene based on the second composite image, the camera setting values and the surface attribute values.

It should be appreciated that although the techniques described herein allow a user to view an AR interface to a real-world scene while the user is not at the scene, the techniques described herein are not limited to being used in this manner and, for example, may be used by users at the real-world scene as well.

It should be appreciated, that aspects of the technology described herein are not limited to capturing a single "snapshot", "image," or "smart photo" of the scene/AR interface, but can include capturing of multiple images or smart photos for a panorama-like experience. Multiple images may be captured to allow for a 360 degrees view of the scene or for covering larger areas that cannot be captured using a single image. The multiple images may be combined (e.g., aligned with one another, overlapped, blended, etc.) to reflect a captured scene. For example, two or more images may be sequentially captured to cover a particular scene. These images may be combined to produce a panoramic image of the scene. Virtual furniture objects may be placed on various surfaces in the individual images or the combined panoramic image. In some embodiments, the metadata for the panoramic image/"smart photo" may include metadata about each individual image and metadata about how the images are to be aligned to generate the panoramic image. The images and the associated metadata may then be transmitted by the first computing device. In other embodiments, processing to combine the multiple images may be completed at the first computing device, and a single panoramic image and associated metadata may be transmitted by the first computing device. In this manner, the techniques described herein can be used to capture the AR interface and metadata associated with the AR interface regardless of the number of images needed to reflect the scene.

Example Systems

FIG. 1 shows an example system 100 that is configured to capture an AR interface being provided to a user at a first computing device 102 and recreate the captured AR interface at a second computing device 104. The first computing device 102 may include a mobile computing device, such as, the user's mobile smartphone, tablet computer, AR headset, or other mobile computing device. As shown in FIG. 1, the first computing device 102 is held by the user at a first location or scene (e.g., a room in a building such as a bedroom, a living room, an office, or a kitchen). The App may be installed on the first computing device 102 and may interact with an AR software program (e.g., ARKit for the iOS platform, ARCore for the Android platform, etc.) to generate an AR interface that presents a view of the scene (i.e., user's physical environment) to the user. It will be appreciated that one or more functions described herein (e.g., generation of the AR interface, identification of flat surfaces, determination of surface value attributes, etc.) may be performed using the AR software program.

Figure 2A:
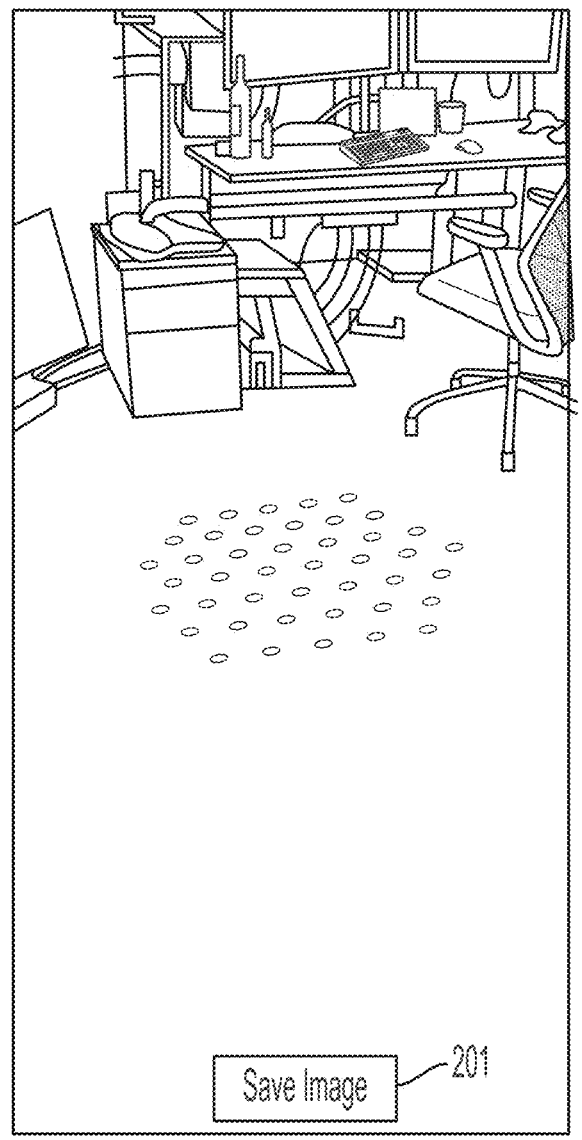
FIG. 2A illustrates an example view of a real-world scene that may be presented to a user of the first computing device of FIG. 1, according to some embodiments of the technology described herein.
Figure 2B:
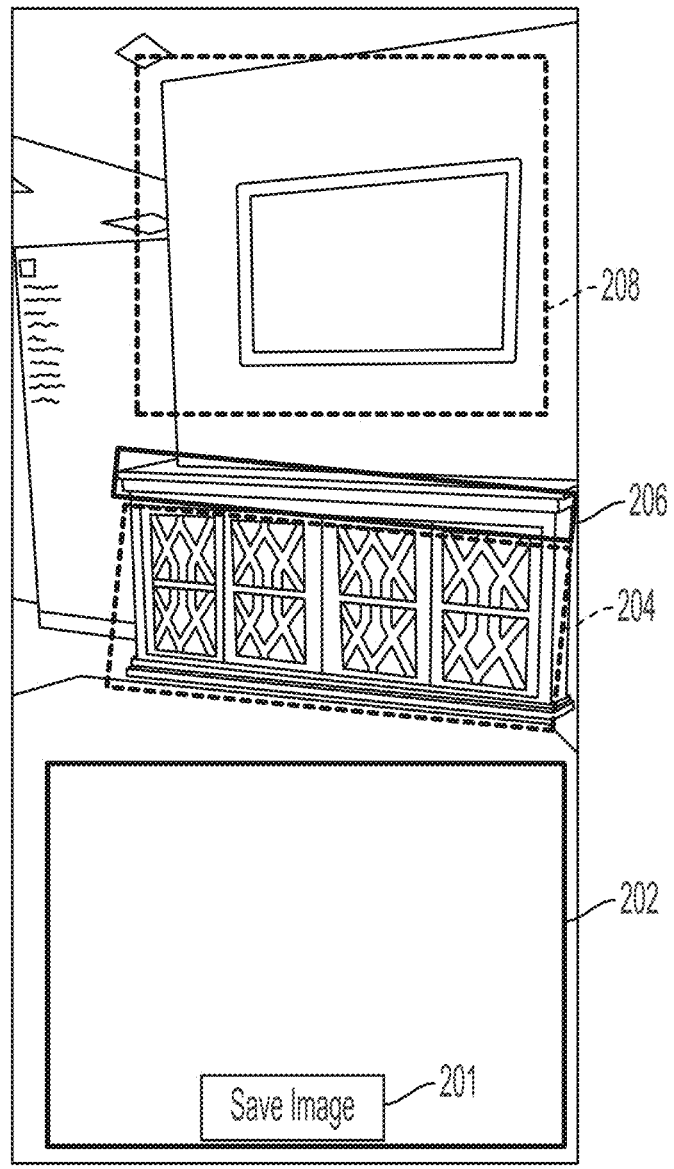
FIG. 2B illustrates one or more scanned surfaces in a scene, according to some embodiments of the technology described herein.
Figure 2C:
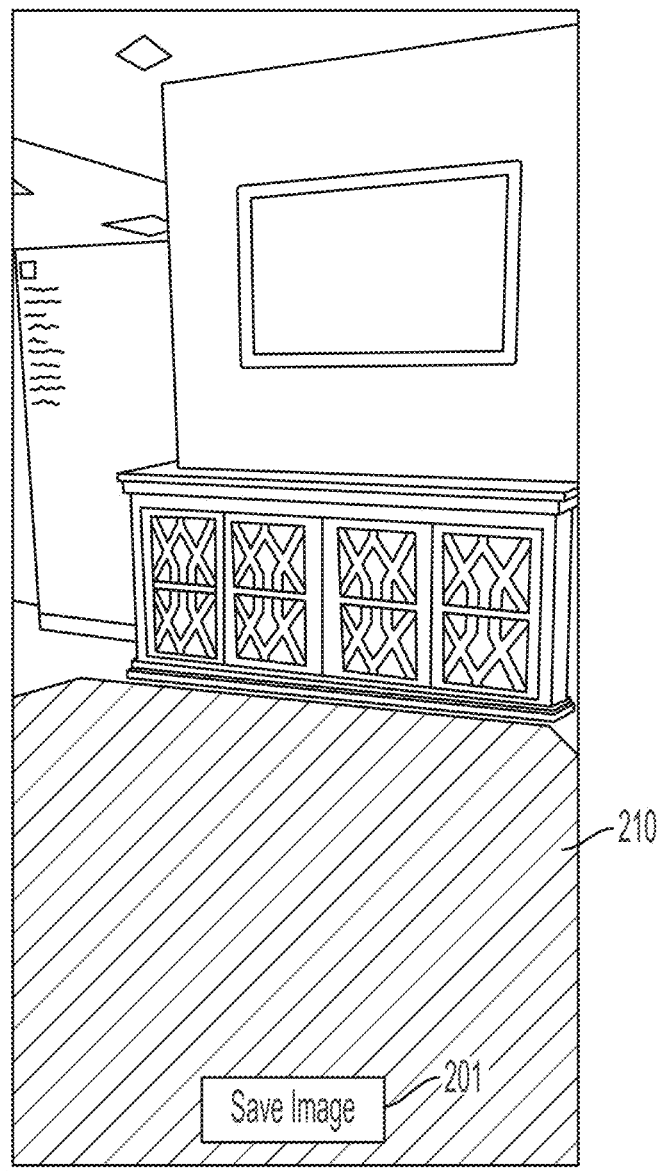
FIG. 2C illustrates one or more identified surfaces in a scene, according to some embodiments of the technology described herein.

FIG. 2A illustrates a view of a real-world scene that may be presented to the user using a camera of the first computing device 102. The user may move the first computing device 102 to capture the entire scene and scan multiple surfaces at the same time. FIG. 2B illustrates various scanned surfaces 202, 204, 206, 208 in the user's scene. In some embodiments, one or more flat surfaces in the scene may be identified using the AR software program. In some embodiments, the AR software program may use motion tracking, plane-detection, and/or localization techniques (e.g., Simultaneous Localization and Mapping (SLAM)) to identify flat surfaces to be used as planes in the App. For example, FIG. 2C illustrates a flat surface 210 (e.g., floor of the room) identified in the scene. In some embodiments, underlying original equipment manufacturer (OEM)/third-party provided AR software (e.g., ARKit, ARCore, Vuforia, Wikitude, etc.) may identify feature points (e.g., 3D points in space) associated with the scene. In some embodiments, flat surfaces may be derived by aligning co-planar points. Also, orientation and location of the surfaces may be determined based on direction of the plane). For example, direction information may be used to identify whether a surface is a floor, a ceiling, or a wall.

In some implementations, the user may select a "save image" button 201, which causes an image of the scene to be captured by the camera of the first computing device 102. The first computing device 102 may assign a scene identifier (e.g., room name or other identifier) to the image. In some embodiments, the user may be prompted to enter the scene identifier for the image. Any number of scenes (e.g., corresponding to different rooms or spaces in the user's home or office) may be captured by the first computing device 102.

Figure 2D:
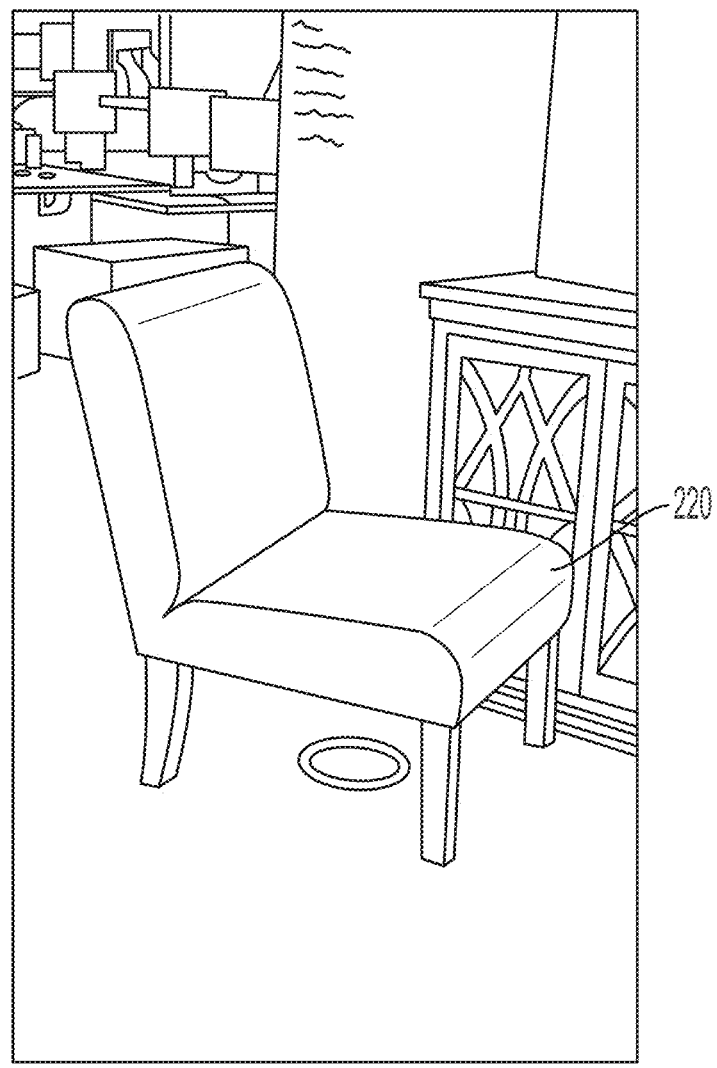
FIGS. 2D and 2E illustrate virtual objects being placed on one or more surfaces in an augmented reality interface generated by the first computing device of FIG. 1, according to some embodiments of the technology described herein.
Figure 2E:
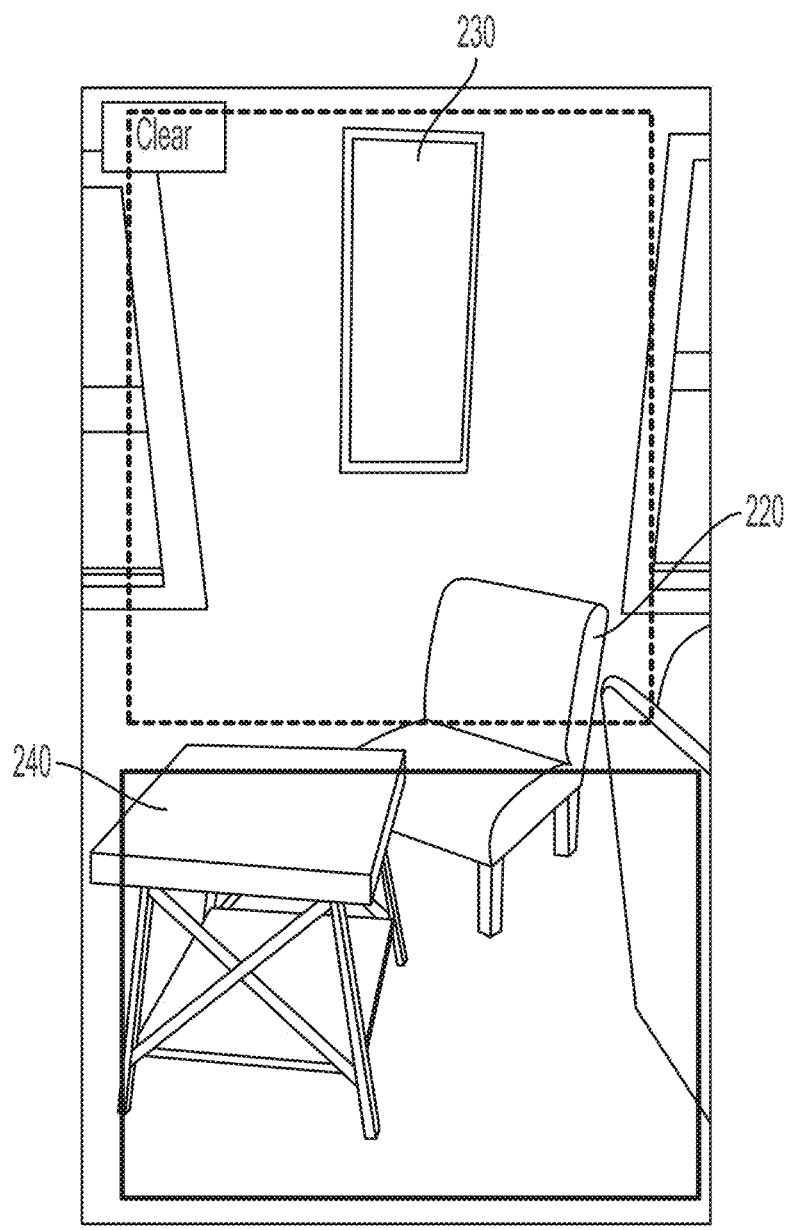
Figure 4:
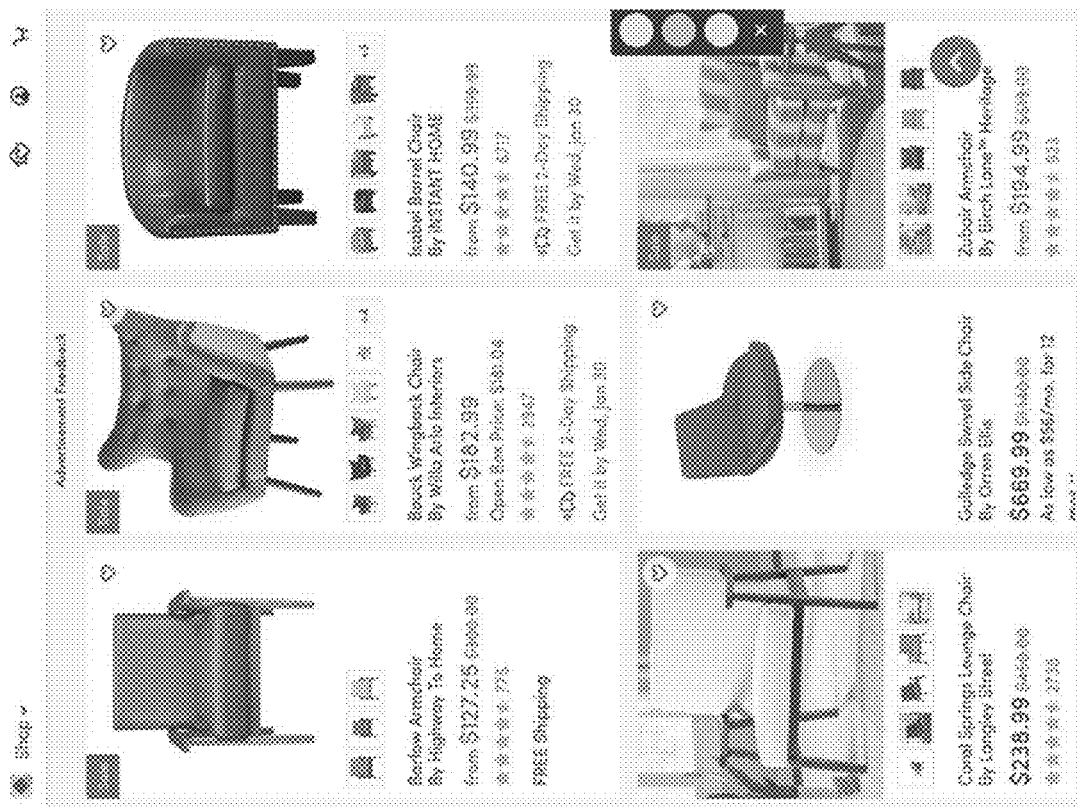
FIG. 4 is diagram of an online catalog used for selection of virtual furniture objects, according to some embodiments of the technology described herein.

In some embodiments, the user may interact with the image by adding piece(s) of furniture selected from the retailer's online catalog (shown in FIG. 4, for example) to the image. The pieces of furniture may be displayed as virtual furniture objects placed on one or more identified flat surfaces in the image. The virtual furniture objects may include virtual 3D models of the pieces of furniture. FIGS. 2D and 2E illustrate virtual furniture objects being placed on various flat surfaces in the image. For example, FIG. 2D illustrates a chair object 220 on the floor and FIG. 2E illustrates chair and table objects (220, 240) on the floor and a wall art object (230) on the wall. The user may also interact with the virtual furniture objects by moving them to different locations on the flat surface and changing the pose (e.g., position and/or orientation) of the objects by rotating them, for example. In this manner, a first composite image may be created at the first computing device 102 by overlaying a selected virtual object onto the image. In some embodiments, metadata associated with the camera (e.g., camera setting values), the scene (e.g., surface attribute values), the image (e.g., image attribute values), and/or the virtual furniture objects (e.g., object attribute values) may also be obtained or determined by the first computing device 102.

In some embodiments, the first computing device 102 may obtain camera setting values used to capture the image. In some implementations, the first computing device 102 may obtain the camera setting values from the AR software program. The camera setting values may include a field of view and a projection matrix. The projection matrix maps 3D points from the scene to 2D points in the image. In some embodiments, the camera setting values may include a camera pose (e.g., a position and/or orientation of the camera while capturing the image).

In some embodiments, the first computing device 102 may determine, using the image, surface attribute values characterizing at least one surface in the image of the scene. In some implementations, the AR software program may determine the surface attribute values and provide the values to the App. The AR software program may capture a set of planes, where each plane is represented by: i) 3D points that represent the plane as a polygon, and ii) polygon plane pose (e.g., position and/or orientation of the plane with respect to the camera while capturing the image). Examples of the surface attribute values for a surface include: 3D points representing a plane and a pose (e.g., position and/or orientation) of the plane. In some embodiments, the surface value attributes may be determined using the feature points identified by the AR software program. In some embodiments, the flat surface(s) represented by the feature points keeps growing in size as more planes and feature points in the scene are identified. The plane/feature points are tracked as the flat surface(s) grows. The surface value attributes for a surface may include plane/feature points, represented as a polygon and pose.

In one embodiment, the first computing device 102 may obtain object attribute values associated with the virtual furniture objects in the image. The object attribute values may specify an identifier of the virtual furniture object (e.g., a product identifier), a position and/or orientation of the virtual furniture object in the image (e.g., with respect to the camera while capturing the image), or a visual characteristic of the virtual object. The visual characteristic of the virtual furniture object may include color, shading, size, transparency, and/or any other suitable visual characteristics, as aspects of the technology described herein are not limited in this respect.

In some embodiments, the first computing device 102 may obtain one or more image attribute values, such as, resolution of the image (e.g., height and width in pixels).

Figure 3:
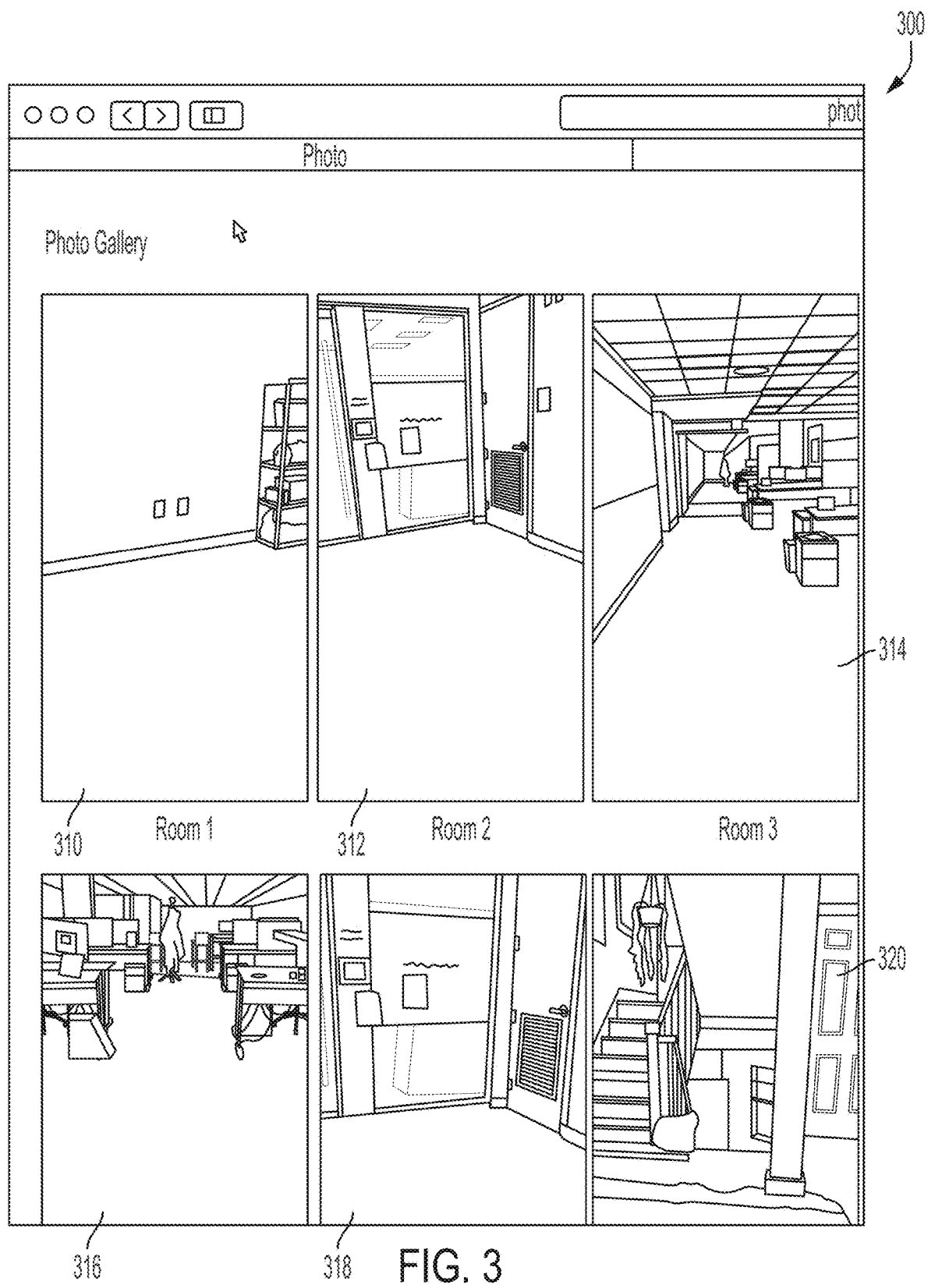
FIG. 3 illustrates a gallery of multiple scenes captured using the first computing device of FIG. 1, according to some embodiments of the technology described herein.

In some embodiments the first computing device 102 may transmit the captured image (e.g., the first composite image) and the metadata to a server computing device 106. The first computing device 102 may generate a uniform resource locator (URL) that points to the image stored on the server computing device 106. In some embodiments, all the scenes/images captured by the first computing device 102 may be presented to the user via a gallery 300, shown in FIG. 3, for example. Gallery 300 may be accessed by entering the URL in a web browser (e.g., at the second computing device 104). In some embodiments, the gallery may be associated with a user account and may present scenes/images captured from multiple devices associated with a particular user. For example, upon accessing the gallery 300, the user may be presented with scenes/images captured from multiple devices as long as the user was signed in to the same user account on each device. In some embodiments, the user may use the images and associated metadata to recreate the AR interface at a different computing device (e.g., second computing device 104). For example, the user may have captured the image of his living room using a first computing device (e.g., user's smartphone), causing the image and the associated metadata to be stored at the server computing device 106. The user may then travel to work and restore the image on a different computing device 104 (e.g., user's office desktop computer) using the metadata. For example, the user may enter the URL in a web browser, causing the gallery 300 to be presented to the user at his desktop computer. Selection of the image from the gallery causes the scene to be recreated at the desktop computer. In this implementation, 3D rendering techniques (e.g., WebGL-based techniques) may be utilized to generate a 3D scene based on the image and the metadata. The 3D scene may be generated by: setting virtual camera settings associated with the 3D scene in accordance with the camera setting values; drawing invisible planes and setting their poses in accordance with the surface attribute values; and/or restoring the virtual furniture objects to the same poses with respect to the camera and restricting their movement to the invisible planes. In this manner, the scene captured at a first location using the user's smartphone is recreated at a different location (remote from the first location) using the user's desktop computer.

In some embodiments, the 3D scene may be generated by rendering the image captured from the user's real-world environment (e.g., at the first computing device) onto a plane in a virtual 3D scene. A virtual camera may be placed in the virtual scene and assigned properties of the camera used to capture the image at the first computing device (e.g., based on camera setting values). The virtual furniture object(s) may be rendered in the 3D scene based on the object attribute values obtained at the first computing device. In some embodiments, movement of the virtual furniture object(s) in the 3D scene may be restricted along the flat surface(s) that was derived at the first computing device. In this manner, the AR interface may be recreated because various components of the 3D scene (e.g., virtual camera, planes/surfaces, and position of virtual objects) may be manipulated based on the image and the metadata associated with the real-world scene. A user may then interact with the 3D scene by clicking and moving the virtual furniture objects) to different locations.

In some embodiments, the virtual furniture objects in the recreated scene (i.e., recreated first composite image) look to-scale with respect to the image. The user may interact with recreated scene/first composite image by adding a virtual furniture object, removing a virtual furniture object, changing a position and/or orientation of a virtual furniture object, and/or changing a visual characteristic of a virtual furniture object. In this manner, a second composite image may be created at the different computing device 104 by changing the recreated first composite image.

It will be appreciated that other 3D rendering techniques may be utilized to recreate the scene based on the platform or device used, without departing from the scope of this disclosure. Also, the scene may be recreated at a different computing device 104 belonging to a different user (e.g., a designer). The techniques described herein may be used to recreate the scene at different devices regardless of the platform used. For example, in embodiments where the computing device 104 is a mobile computing device (e.g., a tablet computer), a built-in 3D rendering engine may be used to recreate the 3D scene using the image and the associated metadata.

Example Processes

Figure 5:
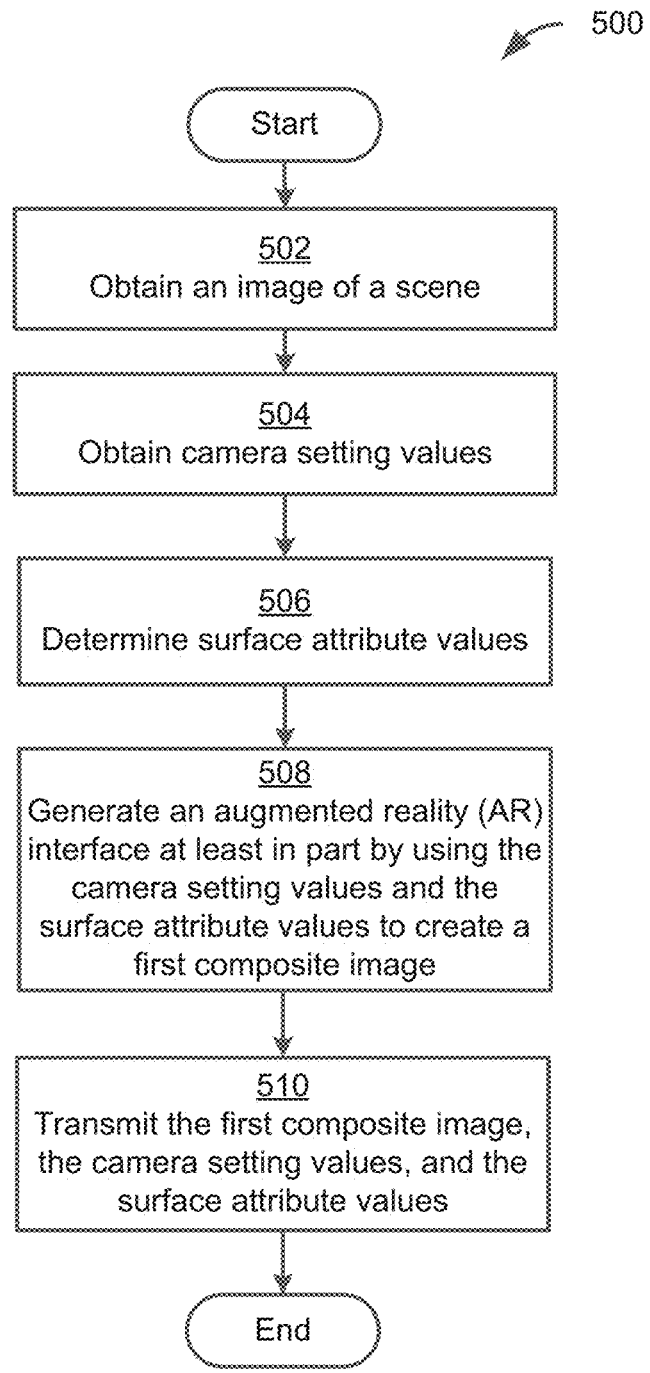
FIG. 5 is a flowchart of an example process for capturing a scene using the first computing device of FIG. 1, according to some embodiments of the technology described herein.

FIG. 5 shows an example process 500 for capturing a scene. The process 500 may be performed using a computing device such as first computing device 102 described above with reference to FIG. 1. As shown, the process 500 comprises an act 502 of obtaining an image of a scene, an act 504 of obtaining camera setting values, an act 506 of determining surface attribute vales, an act 508 of generating an AR interface, and an act 510 of transmitting a first composite image, the camera setting values and the surface attribute values.

In act 502, an image of a scene may be captured using a camera coupled to the first computing device 102. The image may be captured while a user of the first computing device 102 is physically at the scene. The image may represent a view of a real-world scene (e.g., a room where the user is located). The image may be in any suitable format, as aspects of the technology described herein are not limited in this respect. In act 504, camera setting values used to capture the image may be obtained. The camera setting values may include values associated with a field of view of the camera, values indicating a projection from three-dimensional (3D) points in the scene to two-dimensional (2D) points in the image, values indicating a position of the camera, and/or values indicating an orientation of the camera.

In act 506, surface attribute values characterizing surfaces shown in the image of the scene may be determined using the image. The surface attribute values may include values associated with a pose of a plane characterizing each surface.

In act 508, an AR interface may be generated by using the camera setting values and the surface attribute values to create a first composite image. The first composite image may be created by overlaying a virtual object onto the image so that the virtual object is displayed in the AR interface as being on a surface shown in the image of the scene.

In act 510, the first composite image, the camera setting values and the surface attribute values may be transmitted to a computing device that is located remote from the scene. In some embodiments, the computing device may include the server computing device 106. In other embodiments, the computing device may include a computing device different from the first computing device 102 and being used by the user. In yet other embodiments, the computing device may include a computing device different from the first computing device 102 and being used by a different user (e.g., a designer).

In one embodiment, the first composite image and the metadata (e.g., the camera setting values, the surface attribute values, image attribute values, and/or object attributes values) may be transmitted to a server computing device 106. In this embodiment, the image and metadata may be retrieved by a second computing device 104 and used to recreate the scene at a second computing device 104.

In another embodiment, the first composite image and the metadata (e.g., the camera setting values, the surface attribute values, image attribute values, and/or object attributes values) may be transmitted directly to the second computing device 104 and used to recreate the scene at the second computing device 104.

Figure 6:
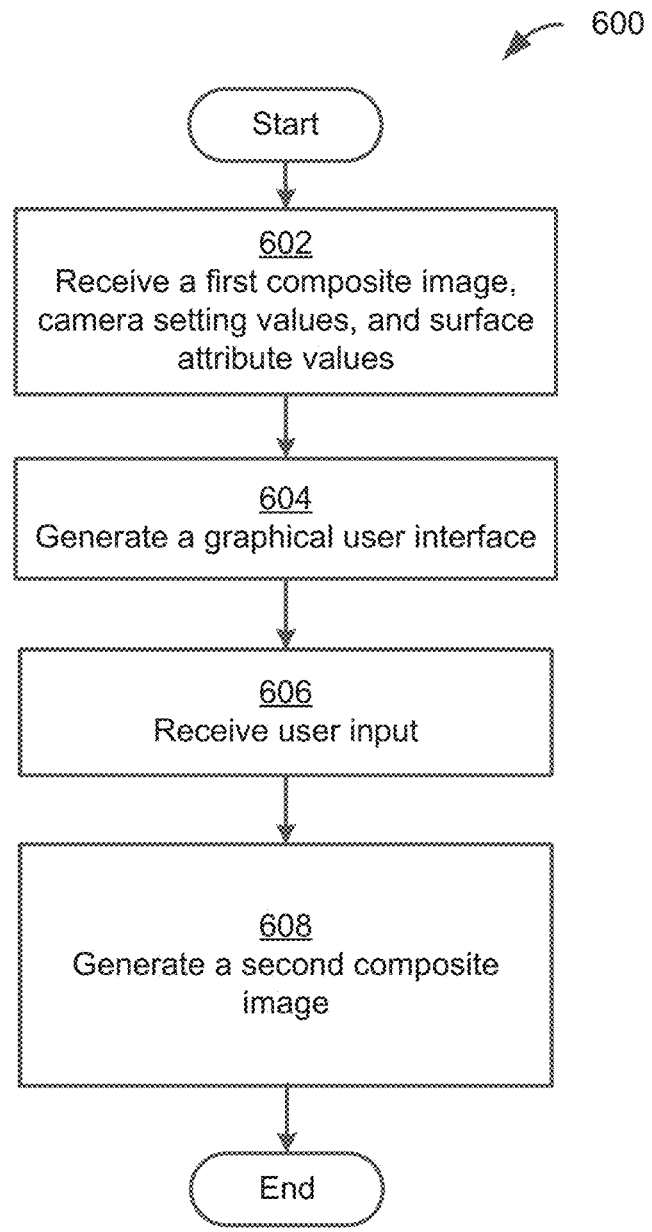
FIG. 6 is a flowchart of an example process for recreating the scene using the second computing device of FIG. 1, according to some embodiments of the technology described herein.

FIG. 6 shows an example process 600 for recreating the scene. The process 600 may be performed using a computing device such as second computing device 104 described above with reference to FIG. 1. As shown, the process 600 comprises an act 602 of receiving a first composite image, camera setting values, and surface attribute values, an act 604 of generating a graphical user interface, an act 606 of receiving user input, and an act 608 of generating a second composite image.

In act 602, the first composite image and the metadata is received at the second computing device 104. The image and metadata may be received from the server computing device 106 or directly from the first computing device 102.

In act 604, a GUI may be generated using the first composite image and the metadata. The GUI may include an augmented reality interface, a virtual reality interface, and/or an interface generated by a 3D rendering technique.

In act 606, user input may be received via the GUI. The user input may indicate a second virtual object to add to the first composite image, indicate a change to the first virtual object in the first composite image, and/or indicate to remove the first virtual object from the first composite image.

In act 608, a second composite image may be generated based on the received user input. In some embodiments, the second composite image is generated by making modifications to the first composite image based on input received from the user via the GUI. For example, the first composite image may include a virtual furniture object (e.g., a sofa) that is placed at a particular location in a room by the user of the first computing device. The designer may re-position the virtual furniture object to a different location in the room and replace the virtual furniture object with a different virtual furniture object (e.g., a different sofa). A second composite image may be generated at the second computing device that reflects these modifications.

In embodiments where the second computing device 104 is associated with a different user (e.g., a designer), the second composite image may be transmitted to the server computing device and retrieved by the first computing device 102 (e.g., to allow the user to view any changes made by the designer). In another embodiment, the second composite image may transmitted by the second computing device 104 directly to the first computing device 102. In this manner, a user and a designer may iteratively co-operate to design a room, each using AR interfaces, and without being in the same room/location.

Illustrative Use Case

To further illustrate aspects of the technology described herein, a detailed example of how the technology may be employed is described herein.

First, a user may open an App on a AR-supported device (e.g., a smartphone, tablet, etc.) and may select a "capture room" option to obtain a snapshot of the AR interface. In response, the App opens an AR session and identifies, for the user, one or more flat surfaces planes)—this is sometimes referred to as "plane-finding" or "localizing" in AR experiences. Next, the user may place a virtual furniture object on a surface and may interact with the virtual furniture object (e.g., by moving it around on the surfaces, rotating it, changing its shading, etc.).

Next, the user may tap the "capture" button (or any other suitable GUI element indicating to the App that a snapshot of the AR interface is to be saved). In response, the App captures a photo from the camera of the AR-supported device and additional metadata. The metadata may include one or more of the following pieces of information:
i. An identifier (e.g., a name of the room)
ii. Camera Setting values used to capture the photo including intrinsic camera values (e.g., field of view, 3D to 2D projection matrix), values indicating the pose of the camera while capturing the photo (e.g., position and rotation of the camera while capturing the photo);
iii. Resolution of photo (e.g., width and height in pixels or any other suitable unit);
iv. A URL to the photo captured from the phone's camera. For example, the URL may point to a copy of the photo stored on a server. Additionally or alternatively, the photo itself may be part of the metadata;
v. Surface attribute values indicating one Or more planes in the photo. The values may specify 3D points that represent the plane(s) as polygons and the position(s) and rotation(s) of the planes with respect to the camera (or any other suitable reference frame) while capturing the image; and
vi. A set of one or more virtual object identifiers (e.g., one or more product IDs) and their poses (e.g., their positions and rotations) with respect to the camera (or any other suitable reference frame) while capturing the image.

Next, the metadata may be stored for subsequent use. For example, the metadata may be stored in JavaScript Object Notation (JSON) format. An illustrative example of such metadata in JSON format is shown below. These metadata may be subsequently used to recreate the AR interface on multiple different platforms.

To recreate a captured AR interface using the metadata stored in ON format a user (the same user that captured the AR interface or a different user) may perform the following steps:
i. The user may select a scene (e.g., a room) that vas previously captured from a gallery of previously captured scenes; ii. The App on the user's device generates a 3D scene (e.g., using a built-in 3D rendering engine) and loads the corresponding metadata (e.g., JSON metadata);
iii. The App loads the photo (e.g., via the URL in the metadata) and sets the photo as the background image in the AR interface;
iv. The App then sets the 3D scene's virtual camera intrinsic parameters and pose to match the camera setting values in the retrieved metadata;
v. The App then draws invisible or at least partially transparent planes and sets their poses based on the surface attribute values in the retrieved metadata;
vi. The App then restores the virtual objects to their poses with respect to the camera (these poses are also indicated in the retrieved metadata) and restricts their movement to the plane(s).

The AR interface is now re-created as the user may interact with the virtual objects and they look to scale with respect to the photo as would be the case in a live AR session. In other embodiments, the user may recreate the photo using a Web interface (rather than a dedicated App). The above-described process may be used in this setting as well, with WebGL selected as the rendering engine.

Example of Metadata in JSON Format

```
{
  "cameraNode": {
    "cameraParams": {
      "fieldOfViewDegrees": 64.66608,
      "fieldOfViewRadians": 1.128636,
      "projectionMatrix": [
        3.1576953,
        0,
        0,
        0,
        0,
        1.5788478,
        0,
        0,
        0.004775545,
        0.0033351989,
        -1.0006669,
        -1,
        0,
        0,
        -0.020006668,
        0
      ]
    },
    "cameraPose": {
      "position": [
        -0.4476279,
        0.06324793,
        1.1533226
      ],
      "quaternionRotation": [
        -0.16709943,
        -0.09654297,
        -0.019684287,
        0.9810045
      ]
```

```
    }
  },
  "fileUri": "https://s3.amazonaws.com/elasticbeanstalk-us-east-1-
139687795354/07895d92d070785c_photo_1jpeg",
  "name": "Lab Room",
  "planes": {
    "planePolygons": [
      {
        "polygonPoints": [
          -1.1377683,
          1.3812941,
          -0.4291542,
          1.3621306,
          0.35050142,
          1.285259,
          1.4143322,
          0.73772323,
          1.4558828,
          0.5764296,
          1.5635324,
          -0.36056623,
          1.5721041,
          -0.7569987,
          1.2234086,
          -1.1129802,
          0.8086044,
          -1.2261775,
          0.1867784,
          -1.3812941,
          -0.6472359,
          -1.3812941,
          -1.2042834,
          -1.2117103,
          -1.3499278,
          -1.1262023,
          -1.5439447,
          -0.9125248,
          -1.5721041,
          0.28372347,
          -1.4377503,
          0.878078,
          -1.4335256,
          0.8894977,
          -1.1753196,
          1.3406882,
          -1.155434,
          1.368822
        ]
      }
    ],
    "planePoses": [
      {
        "position": [
          0.8795924,
          -1.2851852,
          -2.4144094
        ],
        "quaternionRotation": [
          0,
          0.07,
          0,
          1
        ]
      }
    ]
  },
  "products": {
    "productPoses": [
      {
        "position": [
          1.0867236681294226,
          -1.285185217857361,
          -2.7170385269840853
        ],
        "quaternionRotation": [
          0,
          -0.6874582007258505,
          0,
          0.9295302964390024
```
```
        ]
      },
      {
        "position": [
          0,12375646474095206,
          -1.2851852178573608,
          -2.6482161636926302
        ],
        "quaternionRotation": [
          0,
          0.732858248986297,
          0,
          -0.6803813449567082
        ]
      },
      null
    ]
  },
  "rotationClockwise": 0,
  "screenResX": 1440,
  "screenResY": 2880
}
```

Example Computing Device

Figure 7:
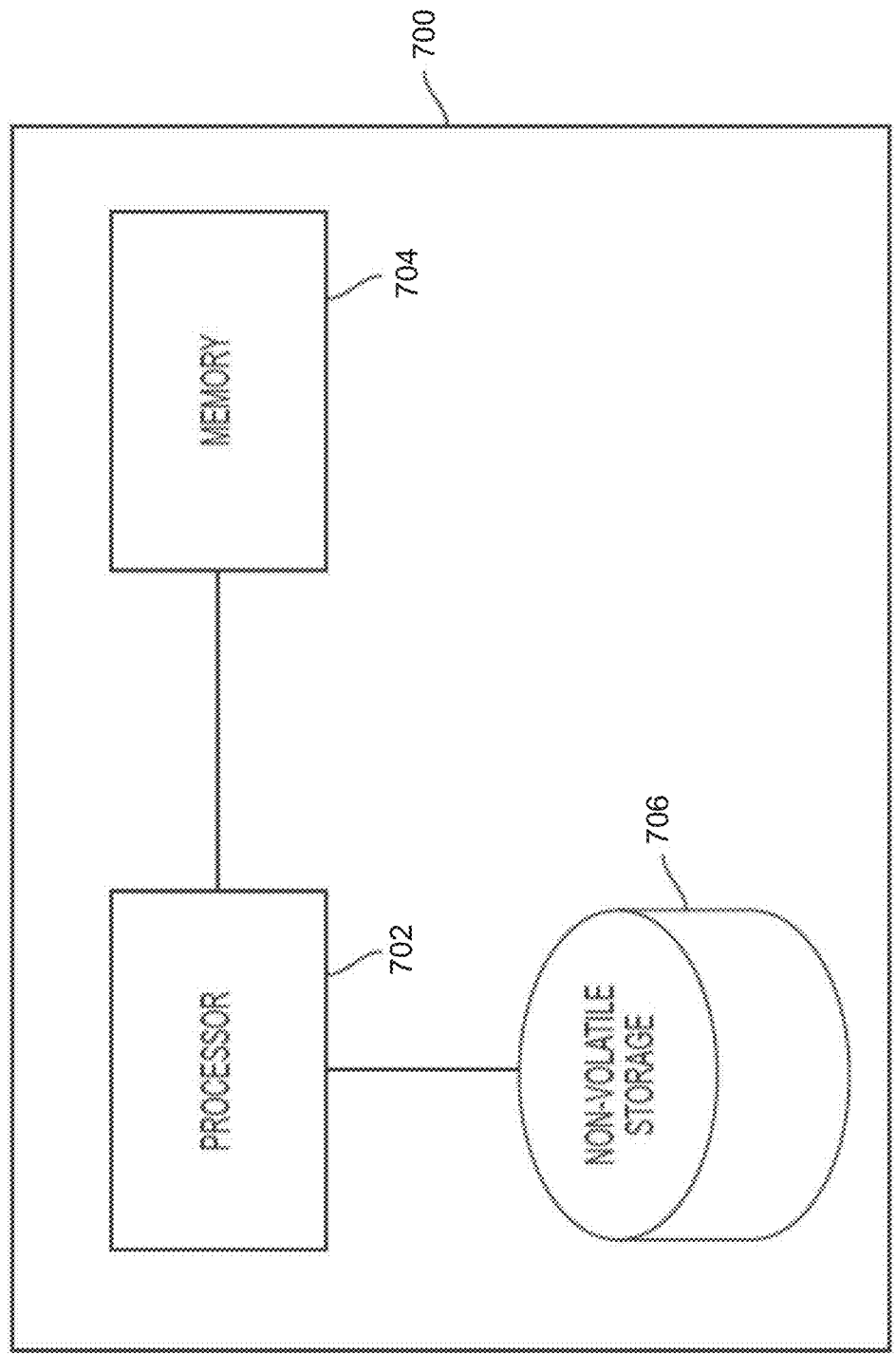
FIG. 7 is a block diagram of an example computer system, according to some embodiments of the technology described herein.

An illustrative implementation of a computing device 700 that may be used in connection with any of the embodiments of the disclosure provided herein is shown in FIG. 7. The computing device 700 may include one or more computer hardware processors 702 and one or more articles of manufacture that comprise non-transitory computer-readable storage media (e.g., memory 704 and one or more non-volatile storage devices 706). The processor 702(s) may control writing data to and reading data from the memory 704 and the non-volatile storage device(s) 706 in any suitable manner. To perform any of the functionality described herein, the processor(s) 702 may execute one or more processor-executable instructions stored in one or more non-transitory computer-readable storage media (e.g., the memory 704), which may serve as non-transitory computer-readable storage media storing processor-executable instructions for execution by the processor(s) 702.

The terms "program" or "software" are used herein in a generic sense to refer to any type of computer code or set of processor-executable instructions that can be employed to program a computer or other processor (physical or virtual) to implement various aspects of embodiments as discussed above. Additionally, according to one aspect, one or more computer programs that when executed perform methods of the disclosure provided herein need not reside on a single computer or processor, but may be distributed in a modular fashion among different computers or processors to implement various aspects of the disclosure provided herein.

Processor-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed.

Also, data structures may be stored in one or more non-transitory computer-readable storage media in any suitable form. For simplicity of illustration, data structures may be shown to have fields that are related through location in the data structure. Such relationships may likewise be achieved by assigning storage for the fields with locations in a non-transitory computer-readable medium that convey relationship between the fields. However, any suitable mechanism may be used to establish relationships among information in fields of a data structure, including through the use of pointers, tags or other mechanisms that establish relationships among data elements.

Various inventive concepts may be embodied as one or more processes, of which examples have been provided. The acts performed as part of each process may be ordered in any suitable way. Thus, embodiments may be constructed in which acts are performed in an order different than illustrated, which may include performing some acts simultaneously, even though shown as sequential acts in illustrative embodiments.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, for example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements);etc.

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion. i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term). The phraseology and terminology used herein is for the purpose of description and should not be regarded as limiting. The use of "including," "comprising," "having," "containing", "involving", and variations thereof, is meant to encompass the items listed thereafter and additional items.

Having described several embodiments of the techniques described herein in detail, various modifications, and improvements will readily occur to those skilled in the art. Such modifications and improvements are intended to be within the spirit and scope of the disclosure. Accordingly, the foregoing description is by way of example only, and is not intended as limiting. The techniques are limited only as defined by the following claims and the equivalents thereto.

What is claimed is:

1. A method, comprising:
   using a first computing device to perform:
      obtaining an image of a scene captured using a camera coupled to the first computing device;
      obtaining camera setting values used by the camera to capture the image;
      determining, using the image, surface attribute values characterizing at least one surface shown in the image of the scene, the at least one surface including a first surface on which a first virtual object can be placed, the surface attribute values including first surface attribute values for the first surface;
      generating an augmented reality (AR) interface at least in part by using the camera setting values and the surface attribute values to create a first composite image by overlaying the first virtual object onto the image so that the first virtual object is displayed in the AR interface as being on the first surface of the at least one surface shown in the image of the scene;
      transmitting, to a second computing device and via at least one communication network, the first composite image, the camera setting values and the surface attribute values;
   receiving, from the second computing device, at least one second composite image obtained by changing the first composite image by a second user, wherein changing the first composite image comprises adding a second virtual object to the first composite image, removing the first virtual object from the first composite image, changing a position and/or orientation of the first virtual object in the first composite image, and/or changing a visual characteristic of the first virtual object in the first composite image; and
   generating a first graphical user interface (GUI) using the at least one second composite image, the camera setting values, and the surface attribute values.

2. The method of claim 1, wherein the first computing device is a mobile computing device and the camera is integrated with the mobile computing device.

3. The method of claim 1, wherein the camera setting values comprise one or more values associated with a field of view of the camera, one or more values indicating a projection from three-dimensional (3D) points in the scene to two-dimensional (2D) points in the image, one or more values indicating a position of the camera, and/or one or more values indicating an orientation of the camera.

4. The method of claim 1, wherein the surface attribute values comprise one or more values associated with a pose of a plane characterizing the at least one surface.

5. The method of claim 1, further comprising:
   presenting the generated AR interface to a user of the first computing device via a display of the first computing device.

6. The method of claim 1, wherein the AR interface includes a first portion for displaying the first composite image and a second portion containing one or more GUI elements through which a user may provide input to the AR interface.

7. The method of claim 1, further comprising:
   receiving, through the AR interface, user input selecting the first virtual object.

8. The method of claim 1, wherein the transmitting further comprises transmitting object attribute values characterizing the first virtual object.

9. The method of claim 8, wherein the object attribute values specify an identifier of the first virtual object, a position of the first virtual object in the image, an orientation of the first virtual object in the image, and/or a visual characteristic of the first virtual object.

10. The method of claim 1, wherein the first virtual object is a virtual furniture object.

11. The method of claim 1, wherein the second computing device is a server computing device or a mobile computing device.

12. The method of claim 1, wherein the surface attribute values specify three-dimensional (3D) points representing one or more planes of the at least one surface as one or more polygons.

13. The method of claim 12, wherein the 3D points further represent one or more positions and one or more rotations of the one or more planes with respect to the camera.

14. The method of claim 1, wherein creating the first composite image comprises determining a position in the image at which to place the first virtual object, based on the first surface attribute values, so that the first virtual object is shown, in the first composite image, as being on the first surface.

15. The method of claim 14, wherein determining the position in the image at which to place the first virtual object comprises:
identifying a location of the first surface in the image using the first surface attribute values; and
determining the position in the image at which to place the first virtual object based on the location of the first surface in the image.

16. A system, comprising:
at least one computer hardware processor; and
at least one non-transitory computer-readable storage medium storing processor executable instructions that, when executed by the at least one computer hardware processor of a first computing device, cause the at least one computer hardware processor to perform:
obtaining an image of a scene captured using a camera coupled to the first computing device;
obtaining camera setting values used by the camera to capture the image;
determining, using the image, surface attribute values characterizing at least one surface shown in the image of the scene, the at least one surface including a first surface on which a first virtual object can be placed, the surface attribute values including first surface attribute values for the first surface;
generating an augmented reality (AR) interface at least in part by using the camera setting values and the surface attribute values to create a first composite image by overlaying the first virtual object onto the image so that the first virtual object is displayed in the AR interface as being on the first surface of the at least one surface shown in the image of the scene;
transmitting, to a second computing device and via at least one communication network, the first composite image, the camera setting values and the surface attribute values;
receiving, from the second computing device, at least one second composite image obtained by changing the first composite image by a second user, wherein changing the first composite image comprises adding a second virtual object to the first composite image, removing the first virtual object from the first composite image, changing a position and/or orientation of the first virtual object in the first composite image, and/or changing a visual characteristic of the first virtual object in the first composite image; and
generating a first graphical user interface (GUI) using the at least one second composite image, the camera setting values, and the surface attribute values.

17. The system of claim 16, wherein the first computing device is a mobile computing device and the camera is integrated with the mobile computing device.

18. The system of claim 16, wherein the camera setting values comprise one or more values associated with a field of view of the camera, one or more values indicating a projection from three-dimensional (3D) points in the scene to two-dimensional (2D) points in the image, one or more values indicating a position of the camera, and/or one or more values indicating an orientation of the camera.

19. The system of claim 16, wherein the surface attribute values comprise one or more values associated with a pose of a plane characterizing the at least one surface.

20. The system of claim 16, wherein the transmitting further comprises transmitting object attribute values characterizing the first virtual object, the object attribute values specifying an identifier of the first virtual object, a position of the first virtual object in the image, an orientation of the first virtual object in the image, and/or a visual characteristic of the first virtual object.

21. The system of claim 16, wherein creating the first composite image comprises determining a position in the image at which to place the first virtual object, based on the first surface attribute values, so that the first virtual object is shown, in the first composite image, as being on the first surface.

22. At least one non-transitory computer-readable storage medium storing processor-executable instructions that, when executed by at least one processor of a first computing device, cause the at least one processor to perform:
obtaining an image of a scene captured using a camera coupled to the first computing device;
obtaining camera setting values used by the camera to capture the image;
determining, using the image, surface attribute values characterizing at least one surface shown in the image of the scene, the at least one surface including a first surface on which a first virtual object can be placed, the surface attribute values including first surface attribute values for the first surface;
generating an augmented reality (AR) interface at least in part by using the camera setting values and the surface attribute values to create a first composite image by overlaying the first virtual object onto the image so that the first virtual object is displayed in the AR interface as being on the first surface of the at least one surface shown in the image of the scene;
transmitting, to a second computing device and via at least one communication network, the first composite image, the camera setting values and the surface attribute values;
receiving, from the second computing device, at least one second composite image obtained by changing the first composite image by a second user, wherein changing the first composite image comprises adding a second virtual object to the first composite image, removing the first virtual object from the first composite image, changing a position and/or orientation of the first virtual object in the first composite image, and/or changing a visual characteristic of the first virtual object in the first composite image; and generating a first graphical user interface (GUI) using the at least one second composite image, the camera setting values, and the surface attribute values.

\* \* \* \* \*